G. BONITI.
ARTILLERY FIRE CONTROL APPARATUS.
APPLICATION FILED APR. 20, 1918.
1,409,891.
Patented Mar. 14, 1922.
2 SHEETS—SHEET 1.
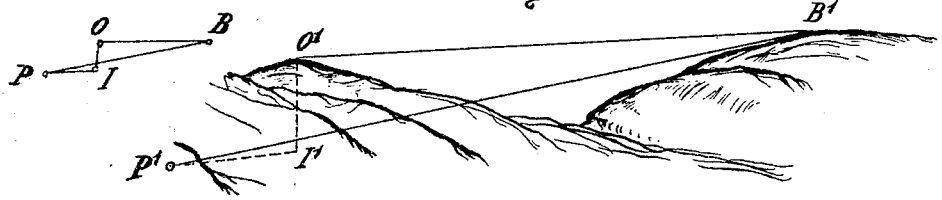
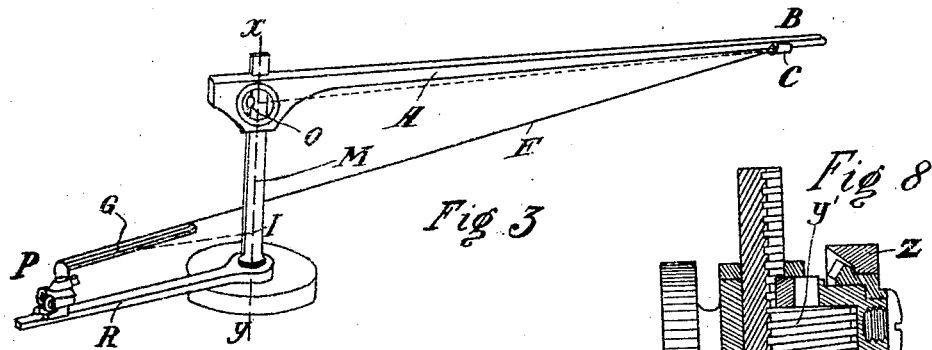
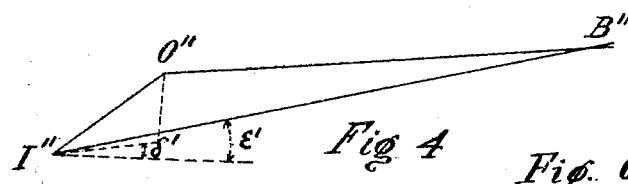
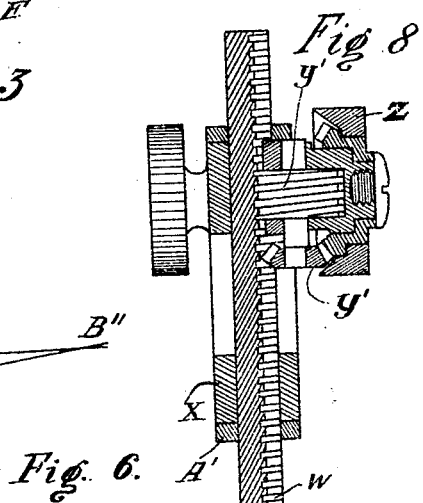
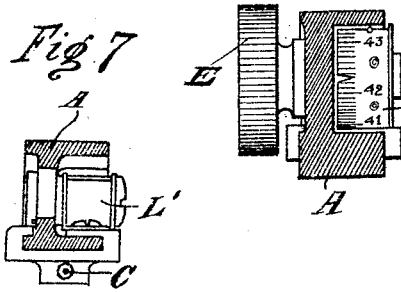
INVENTOR
Girardo Boniti
BY H. W. Plucker
ATTORNEY

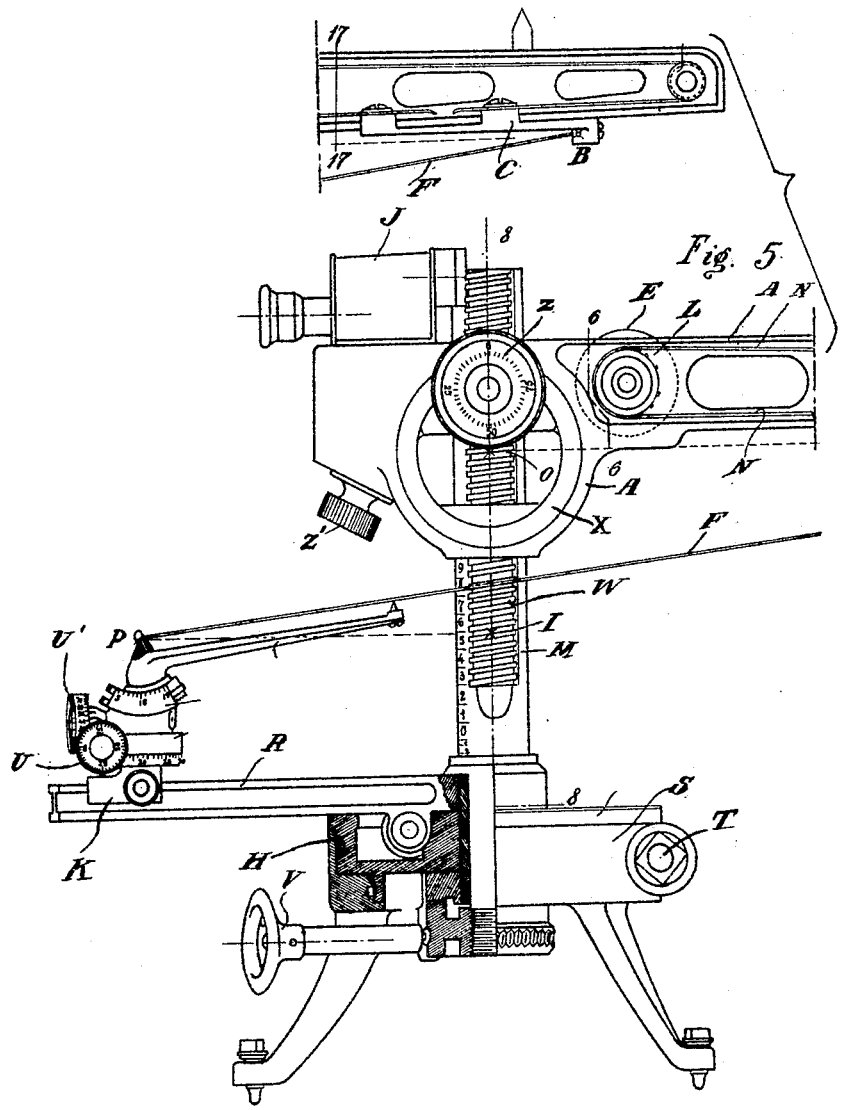

UNITED STATES PATENT OFFICE.

GERARDO BONITI, OF PAVIA, ITALY.

ARTILLERY-FIRE-CONTROL APPARATUS.

1,409,891.   Specification of Letters Patent.   Patented Mar. 14, 1922.

Application filed April 20, 1918. Serial No. 229,875.

*To all whom it may concern:*

Be it known that I, GERARDO BONITI, a subject of the King of Italy, residing at Vigevano, Pavia, in the Kingdom of Italy, have invented certain new and useful Improvements in Artillery-Fire-Control Apparatus, of which the following is a specification.

It is often necessary or desirable, particularly in war, to indicate from a distant observation post the objects aimed at or points on the ground to the batteries or to subordinate detachments or to other observation posts.

Several well known methods are in use, which enable the position of a target to be located on suitably prepared topographical maps or charts. These methods necessitate the use of topographical charts and plans or of graphic devices which are not always available and which it is not practicable to apply when it is a question of naval or aerial targets.

The apparatus forming the subject-matter of the present invention is of general application, and does not require the use of any graphic device.

The apparatus is based on the principle of arranging a very fine wire or thread exactly parallel to the line of elevation of the basic gun of the battery with respect to a given target, that is to say the line joining the muzzle to the centre of the object to be aimed at, of measuring the angle formed by this wire with a horizontal plane, and similarly the angle formed by the vertical plane passing through the wire with another plane of reference, so as to obtain directly the angles of elevation, traverse and convergence that should be communicated to the battery, as well as the distance separating the battery from the target, and other particulars useful for the guidance of the firing.

The apparatus located at the observation post comprises essentially an aiming member and one or more indicating members. The aiming member, handled by the operator, fulfils the functions of a goniometer for the purpose of measuring the angle of elevation and the angle of traverse relative to the position of the target with respect to the apparatus. The indicating appliances represent the goniometers of the distant observation posts or of the distant battery and are arranged on the apparatus in such a way as to take up, on a reduced scale, exactly the same topographical and altimetric position with respect to the aiming member as distant goniometers or the distant fire arm occupy with respect to the apparatus.

The movements given to the aiming member in directing the line of sight on to the target are transmitted by means of a special device to the indicating members, in such a way that the latter indicate the angle of elevation and the angle of traverse that the distant goniometers or guns would measure if their operators had the target in view or had located it.

It follows that when the angles of elevation and of traverse have been read off on the indicating members and communicated immediately to the interested parties, the latter are quickly in a position to seek and locate the target and to aim the fire arms.

The degree of approximation of the results depends solely on the degree of approximation in the estimate or measurement of the distance between the apparatus and the target, for the apparatus may be constructed in such a way as to enable the slightest variations to be followed either as regards the aiming member or as regards the indicating members.

The accompanying drawings illustrate by way of example two constructional forms of the invention. Of course the details of form and construction may differ in practice from those described here and illustrated in the accompanying drawings without thereby going outside the domain of the present invention.

Figure 1 shows the problem to be solved transferred to the field.

Figure 2 shows how the solution of the problem is effected by means of the apparatus.

Figure 3 is a diagrammatical view of the apparatus.

Figure 4 shows how the distance between the observation post and the target is determined.

Figure 5 shows on an enlarged scale the construction of the apparatus (Figure 3).

Figure 6 is a section 6—6 of Figure 5.

Figure 7 is a section 7—7 of Figure 5.

Figure 8 is a section 8—8 of Figure 5.

In a general line the points O, B, P, I of the apparatus (Figure 2) represent on a reduced scale and in their exact position in space the points O', B', P', I' (Figure 1) which determine respectively the positions of the observation post, the target, the basic gun of the battery, and the intersection I' of the vertical dropped from the observation post O' with the horizontal plane passing through the fire arm P.

The metal wire starting from the point B rests on the point P, and always remains taut. The wire represents the line of elevation P', B' (Figure 1), both as regards its position in space, and to scale as regards its length.

Diagrammatically the apparatus comprises (Figures 3 and 4):—

A column M having its axis $x-y$ always vertical on its base; a bar A the shoe of which is keyed to the column M and may be fixed thereto at various heights. The bar A is capable of pivoting about an axis (the point O of Figure 2) normal to the axis $x-y$ of the column M and is displaceable thereby in a zenith direction;

A rule R pivoting about the vertical axis of the column M, at the same time remaining in contact with the upper side of the base, and consequently rotating in a horizontal plane, in which it may be moved into a specified position.

A small goniometer G, similar to the ordinary goniometers, can slide along the rule R and be fixed thereto at various distances from the axis $x-y$ of the column. In the goniometer G the telescope is replaced by a little rod having at its extremity a needle index.

A very thin steel wire F, one end of which is attached to a cursor C which can slide along the bar A and be fixed thereto at variable distances from the center of suspension of the bar, while at the other end the wire rests on the bottom of a notch cut in the center of rotation P of the goniometer devices. A weight or other suitable device keeps the wire constantly taut.

The determination of the data is effected in the following manner:—

In the observation post O', (Figure 1), after levelling the apparatus and bringing it into such a position that the wire represents the line of elevation of the basic gun P with respect to the target, it is necessary:—

To lower or raise the bar A on the column M until the distance between O and the point I (which represents the point I' of Figure 1) corresponds, on the selected scale, to the difference of level between the observation post and the battery (O' I' in Figure 1);

To rotate the rule R until it marks, with respect to a guiding point, the magnetic north for instance, such an angle of collimation that the point P, when the operation is completed, is located in the plane O' I' P' (Figure 1), and represents exactly the basic gun P' of the battery; the rule R is fixed in this position;

To displace the cursor C along the bar A and to fix it on the division corresponding to the real distance between the observation post O' and the target B', so as to locate, on the selected scale, the point B of Figure 2. Suitable graduating devices render these operations easy, quick and exact.

The rotation of the column and of the bar about the axis $x-y$ and of the bar about O brings on to the target the line of sight OB or another visual ray parallel to the line of sight, for instance, the optical axis of a telescope fixed to the bar. After that the wire PB will be parallel to the line of elevation P' B'.

By rotating the small rod of the goniometer G until the point of the needle pointer is brought into contact with the wire it will be possible to read off from the quadrant of the goniometer the desired vertical and horizontal angles. The distance between the battery and the target can be read directly by means of a suitably graduated thin ribbon which is fixed to the cursor C and the other extremity of which is brought into contact with the point P.

Figure 5 shows on an enlarged scale the construction of the apparatus. In order to displace the cursor C the operator rotates the button E, the movement of which is transmitted to the cursor by a metal ribbon N which passes over two rollers L, L' and upon which is engraved the scale concerning the distance between the observation post and the battery. The base of the apparatus consists of a box S resting on a tripod with levelling or adjusting screws and enclosing a disc D to which the various members are attached. A worm V serves to make the disc D rotate in the box S and enables the adjustment of the apparatus to be effected easily and quickly.

The various appliances enable the distances to be obtained from the apparatus to the nearest metre and the angles to the nearest thousandth.

T is a worm which, by gearing with the worm wheel H of the disc B, makes the disc rotate together with the rule mounted on the latter. K is the slide of the goniometer sliding along the rule. Q and Q' are two quadrants of the goniometer, and V, V' the two worms that effect the displacements of the index rod G. J is the telescope for establishing the line of sight. Z is a thumb-screw which by means of the bevel gearing X and the pinion Y' serves to displace the bar along the column M which with this end in view is provided with an internal screw thread W. A' is the shoe of the bar A and serves to guide it along the column M. X is a toothed wheel engaged with the worm Z' which serves to rotate the bar A about O.

The use of the apparatus is subjected to the knowledge of the data of position, that is to say, the horizontal distance from the observation post to the basic gun, the difference of level between the observation post and the basic gun, and the angle of collimation.

It is also necessary to know to a good approximation the distance between the observation post and the target in order to complete the adjustment of the apparatus and to obtain the required data to a sufficient approximation.

The distance can be found by measurement on the topographical chart or deduced by way of reference to the already known distances of other targets in the neighbourhood of the target in question.

The apparatus forming the subject-matter of the invention will in the majority of cases enable this distance to be measured, serving simultaneously as a goniometer and as a calculating device.

The principle upon which the process is based is the same general principle as is adopted for the apparatus, viz: that of representing in space, on a reduced scale, and in their exact relative positions, the angles of the triangle: target B'', observation post O'', subsidiary observation post or goniometer D'', and obtaining the length of the side O'' B'' which is the required distance.

As a subsidiary observation post a lateral observation post may be taken, or the controlling observation post of the battery, or preferably an observation post situated at a few hundred yards from the observation post O'' and provided with a goniometer the axis of which is directed towards the apparatus. In order to determine the real distance O'' B'' the vertical angle E' and the horizontal angle E' are measured with the goniometer at D'' and are communicated to the operator at O, who marks them on the goniometer previously put into a condition to represent the goniometer at D'' as a basis for the data of position of the subsidiary observation post D''. That being done, the operator, after directing the line of sight towards the target, displaces the cursor along the bar until the metal wire is brought into contact with the pointer on the rod G. The position of the cursor will indicate on the ribbon scale N the required distance O'' B'' (Figure 4).

The knowledge of the angle E' would suffice for determining the distance, but the angle of elevation E' is also taken into account as a checking and correcting element, which has more than a negligible influence on the accuracy of the results.

When it is desired to determine the value of the horizontal projection of the real distance measured, the operator arranges the bar in a horizontal plane and displaces the cursor until the metal wire is again brought into contact with the index pointer of G. The new position of the cursor will indicate the horizontal distance between the observation post and the target.

When once this distance is known, it will be possible to determine quickly with the apparatus the distance between the target and all the batteries and all the dependent observation posts, and simultaneously the angles of elevation and traverse accurately corrected for the error of convergence.

A new and important result of the apparatus is that of indicating the targets at a distance.

When once the distance between the observation post and the target has been determined, the angles of elevation and traverse will quickly be obtained, as already mentioned, for communication to the dependent observation posts, which will thereby be in possession of the necessary elements for directing the optical axis of their goniometer towards the target indicated.

With the apparatus, the lateral deviations and the heights of bursting of the projectiles may also be measured, by the mere operation of sighting towards the points of bursting of the projectiles. The apparatus indicates the result referred to the position of the battery as if the operator were placed beside the fire arm and as if he were measuring the lateral deviations and the heights of bursting directly with the goniometer.

By bringing the telescope on to the point of bursting of the projectiles the position of the metal wire on the apparatus is varied. Consequently the gonimoter will measure a fresh angle of elevation and a fresh angle of traverse. The differences, with respect to the angles previously marked on the goniometer, will indicate the angular value of the effective height of burst, and of the correction that must be made in order to have the firing direct.

All the operations summarily described above are referred to the base piece of the battery.

It would be useful, especially for large and medium calibres, to determine the data of position also for the other guns in the battery, a comparatively simple operation as soon as the determination has been effected with respect to the base piece.

Without modifying anything in the exact principle and in the aim of the parallelism between the axes of the guns of the battery, the knowledge of the data of position of all the guns would enable the fire of each piece to be made to converge upon the same point of the target or to be aimed directly at some other desired point of the target, which would result in an economy of projectiles and of time and would eliminate the calculations or the estimation of the interval between the points that it is desired to strike.

The operator at O' (Figure 1) will only have to mark on the apparatus the data of position of the gun in question, which operation requires a minimum displacement of the devices after which he will aim at the point towards which he wishes to direct the fire and will measure directly the required data in the usual way.

The apparatus may be completed for the purpose of determining simultaneously the data of batteries existing on both sides of the bar A. In this case two rules 66 will be employed, provided with goniometers, one of which revolves in one semi-circumference and the other turns in the other semi-circumference, about the column M. The wires attached to the cursor C will also be two, each going to the centre of rotation of one of the two goniometers.

What I claim and desire to secure by Letters Patent of the United States is:—

1. Artillery fire control apparatus comprising a base, an aiming member mounted on said base for horizontal and vertical swinging movements, a cursor in sliding engagement with said aiming member, an arm mounted on said base for horizontal swinging movements, a carriage adjustably mounted on said arm, a goniometer on said carriage, and a wire extending from said cursor to said goniometer.

2. Artillery fire control apparatus comprising a base, a vertical pivot on said base, a column mounted on said vertical pivot, a slide adjustably mounted on said column, a horizontal pivot carried by said slide, a bar mounted on said horizontal pivot, a cursor in sliding engagement with said bar, an arm mounted on said base for horizontal swinging movements, a carriage adjustably mounted on said arm, a goniometer on said carriage, and a wire extending from said cursor to said goniometer.

3. Artillery fire control apparatus comprising a base, a vertical pivot on said base, a column mounted on said vertical pivot, a slide adjustably mounted on said column, a horizontal pivot carried by said slide, a bar mounted on said horizontal pivot, sighting means on said bar, a cursor in sliding engagement with said bar, an arm mounted on said vertical pivot, a carriage adjustably mounted on said arm, a goniometer on said carriage, a wire extending from said cursor to the center of rotation of said goniometer, and means for keeping said wire taut.

4. Artillery fire control apparatus comprising a base, a vertical pivot on said base, a column mounted on said vertical pivot, a slide adjustably mounted on said column, a horizontal pivot carried by said slide, a bar mounted on said horizontal pivot, sighting means on said bar, a cursor in sliding engagement with said bar, an arm mounted on said vertical pivot, a carriage adjustably mounted on said arm, a goniometer on said carriage, a wire extending from said cursor to the center of rotation of said goniometer, and means for keeping said wire taut, the goniometer including a rod and an index needle on said rod adapted to be brought into coincidence with said wire.

5. Artillery fire control apparatus comprising a vertical scale, a slide adjustably mounted on said scale, a scale pivoted to said slide, a cursor in sliding engagement with the latter scale, an arm mounted for rotation about said vertical scale, a carriage movable longitudinally of said arm, a goniometer on said carriage, a flexible member secured to said cursor, means for guiding said flexible member through the center of rotation of said goniometer, and means for keeping said flexible member taut.

In testimony whereof I affix my signature in presence of two witnesses.

GERARDO BONITI.

Witnesses:
IVAN LAVRETSKY,
E. C. BURKE.